United States Patent
Okamoto et al.

(10) Patent No.: US 11,258,512 B2
(45) Date of Patent: Feb. 22, 2022

(54) RECEIVING APPARATUS AND RECEIVING METHOD

(71) Applicant: NIPPON TELEGRAPH AND TELEPHONE CORPORATION, Tokyo (JP)

(72) Inventors: Seiji Okamoto, Musashino (JP); Masanori Nakamura, Musashino (JP); Kengo Horikoshi, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/055,045

(22) PCT Filed: May 8, 2019

(86) PCT No.: PCT/JP2019/018384
§ 371 (c)(1),
(2) Date: Nov. 12, 2020

(87) PCT Pub. No.: WO2019/220976
PCT Pub. Date: Nov. 21, 2019

(65) Prior Publication Data
US 2021/0218471 A1   Jul. 15, 2021

(30) Foreign Application Priority Data
May 16, 2018 (JP) .............................. JP2018-094446

(51) Int. Cl.
*H04B 10/2513* (2013.01)
*H04B 10/079* (2013.01)
*H04B 10/61* (2013.01)

(52) U.S. Cl.
CPC ... *H04B 10/2513* (2013.01); *H04B 10/07951* (2013.01); *H04B 10/6161* (2013.01)

(58) Field of Classification Search
CPC .......... H04B 10/2513; H04B 10/07951; H04B 10/6161; H04J 11/00; G02F 2/00
(Continued)

(56) References Cited

U.S. PATENT DOCUMENTS 7,978,982 B2 * 7/2011 Hosking ............ H04B 10/2513
  398/147
9,385,766 B2 * 7/2016 Abe ...................... H04B 1/123
(Continued)

FOREIGN PATENT DOCUMENTS

WO   WO-2015141658 A1   9/2015

OTHER PUBLICATIONS

Hotmath, Rate of Change, Nov. 2016. Varsity Tutors. All Document. https://web.archive.org/web/20161105195745/https://www.varsitytutors.com/hotmath/hotmath_help/topics/rate-of-change (Year: 2016).*

(Continued)

*Primary Examiner* — Dibson J Sanchez
(74) *Attorney, Agent, or Firm* — Harness, Dickey & Pierce, P.L.C.

(57) ABSTRACT

A reception apparatus includes a dispersion compensation unit configured to acquire an electrical signal resulting from conversion of an optical signal and perform, on the electrical signal, dispersion compensation with a predetermined compensation amount, a clip rate measurement unit configured to measure a clip rate for the electrical signal subjected to the dispersion compensation, and a control unit configured to detect the compensation amount that minimizes the clip rate.

5 Claims, 5 Drawing Sheets

(58) Field of Classification Search
USPC .................................... 398/9–38, 202–214
See application file for complete search history.

(56) References Cited

U.S. PATENT DOCUMENTS

| | | | |
|---|---|---|---|
| 9,544,055 B2* | 1/2017 | Rapp | H04B 10/616 |
| 10,541,757 B2* | 1/2020 | Maeda | H04B 10/255 |
| 2008/0031633 A1* | 2/2008 | Hoshida | H04B 10/677 |
| | | | 398/149 |
| 2009/0016737 A1* | 1/2009 | McVey | H04B 10/29 |
| | | | 398/147 |
| 2009/0116844 A1* | 5/2009 | Tanaka | H04B 10/677 |
| | | | 398/115 |
| 2009/0226165 A1* | 9/2009 | Tanaka | H04B 10/6971 |
| | | | 398/25 |
| 2010/0329698 A1* | 12/2010 | Nakashima | H04B 10/6161 |
| | | | 398/208 |
| 2012/0027418 A1* | 2/2012 | Secondini | H04L 25/03133 |
| | | | 398/158 |
| 2012/0045208 A1* | 2/2012 | Yasuda | H04L 27/223 |
| | | | 398/65 |
| 2012/0051754 A1* | 3/2012 | Sakamoto | H04B 10/07953 |
| | | | 398/115 |
| 2012/0076502 A1* | 3/2012 | Swanson | H04B 10/0795 |
| | | | 398/136 |
| 2012/0148265 A1* | 6/2012 | Chang | H04B 10/6161 |
| | | | 398/208 |
| 2013/0045015 A1* | 2/2013 | Kuschnerov | H04B 10/61 |
| | | | 398/208 |
| 2013/0084080 A1* | 4/2013 | Shibutani | H04B 10/6161 |
| | | | 398/208 |
| 2015/0229410 A1* | 8/2015 | Magri | H04B 10/6971 |
| | | | 398/26 |
| 2015/0288458 A1* | 10/2015 | Honda | H04J 14/02 |
| | | | 398/81 |
| 2016/0164610 A1* | 6/2016 | Hara | H04B 10/616 |
| | | | 398/159 |
| 2017/0070296 A1 | 3/2017 | Okamoto et al. | |

OTHER PUBLICATIONS

Nebojsa Stojanovic et al., "Chromatic Dispersion Estimation Method for Nyquist and Faster Than Nyquist Coherent Optical Systems", OFC2014, Optical Society of America, Mar. 9, 2014.

* cited by examiner

RECEIVING APPARATUS AND RECEIVING METHOD

CROSS-REFERENCE TO RELATED APPLICATIONS

This application is a 371 U.S. National Phase of International Application No. PCT/JP2019/018384, filed on May 8, 2019, which claims priority to Japanese Application No. 2018-094446 filed on May 16, 2018. The entire disclosures of the above applications are incorporated herein by reference.

TECHNICAL FIELD

The present invention relates to a reception apparatus and a reception method.

BACKGROUND ART

Optical fiber transmission schemes allow high-speed data transmission and long-distance data transmission. In particular, a coherent optical transmission scheme put to practical use around 2010 and using a digital signal processing technology enables high-speed data transmission with a transmission rate per wavelength of 100 gigabits per second (Gbit/s) or more.

Note that the coherent optical transmission scheme is an optical communication scheme assuming that coherent reception is performed on a receiving side. Coherent reception is an optical reception scheme that uses a local oscillation light source to cause received light and local oscillation light to interfere with each other and that then converts the received light into an electrical signal by using a photoelectric conversion element such as a photodiode. The coherent reception has the feature that the received light can be converted into an electrical signal with information regarding the phase and amplitude of the light being saved. Additionally, in the coherent reception, high reception sensitivity can be achieved by using a high-power local oscillation light source. This is because the magnitude of a photocurrent signal in the coherent reception is given by the product of the amplitude of the received light and the amplitude of the local oscillation light.

In general, in the optical fiber transmission, possible signal distortion caused by chromatic dispersion is a problem. Light propagating through optical fibers varies in sensed refractive index according to the wavelength of the light. Due to modulation, signal light used for data transmission has a spread of frequency comparable to a modulation rate. A long-wavelength-side component and a short-wavelength-side component of the optical signal propagate through the optical fibers at different group velocities, and thus an increased transmission distance makes the signal more distorted, leading to more difficult demodulation.

To avoid the effect of signal distortion due to chromatic dispersion, for example, the following methods are used: (1) using zero dispersion bands, (2) using dispersion compensation fibers for compensation for optical chromatic dispersion, and (3) ensuring chromatic dispersion using digital signal processing.

Note that the zero dispersion band is a waveband in which the chromatic dispersion is zero. In typical single-mode optical fibers for communication, the zero dispersion band is a band near 1.3 µm (micrometers). This is because, in this band, the wavelength dependency of a propagation coefficient has a substantially flat property. Additionally, the dispersion compensation fibers are optical fibers designed to have a chromatic dispersion property opposite to a normal chromatic dispersion property. By inserting, through a transmission line, dispersion compensation fibers each with an appropriate length, the amount of chromatic dispersion in the entire transmission line can be reduced.

Above-described method (1) has a problem that the effect of four-wave mixing leads to significant degradation of signal quality during wavelength multiplex transmission. Additionally, method (2) described above has a problem of requiring expensive and bulky dispersion compensation fibers, leading to a disadvantageous increase in installation costs. Because methods (1) and (2) described above pose such problems, above-described method (3) is typically widely used for the coherent optical transmission scheme.

Method (3) described above uses digital signal processing to apply, to the received signal, chromatic dispersion that is opposite to the chromatic dispersion occurring in the transmission line. This cancels the chromatic dispersion to improve the quality of the received signal. Performing this digital processing requires recognition of the amount of chromatic dispersion occurring in the transmission line. A method for recognizing the amount of chromatic dispersion occurring in the transmission line is, for example, a method for measuring the amount of chromatic dispersion in advance. However, this method requires a measuring instrument. A more convenient method requiring no measuring instrument is, for example, a method for analyzing the received signal to estimate the amount of chromatic dispersion.

Examples of the method for analyzing the received signal to estimate the amount of chromatic dispersion include a method for transmitting and receiving a known training signal sequence in advance as described in PTL 1, and a method for monitoring parameters for the signal while sweeping the amount of chromatic dispersion compensation for compensation for the chromatic dispersion, as described in NPL 1.

CITATION LIST

Patent Literature

PTL 1: WO 2015/141658

Non Patent Literature

NPL 1: Nebojsa Stojanovic et al., "Chromatic Dispersion Estimation Method for Nyquist and Faster Than Nyquist Coherent Optical Systems", OFC2014 Th2A.19, 2014

SUMMARY OF THE INVENTION

Technical Problem

However, the method described in PTL 1 transmits and receives the training signal sequence and thus has the problems of an increased cost of a transceiver and a reduced throughput. In the method described in NPL 1, for example, a clock extraction sensitivity or an error in an adaptive filter may be monitored as a parameter. However, monitoring of these parameters requires a configuration for recognizing a baud rate and a modulation format for the received signal in advance, disadvantageously increasing the cost of the transceiver.

Note that the clock extraction sensitivity is a detection sensitivity used when clock synchronization is performed. In general, the clock extraction sensitivity refers to the sensitivity of a phase comparator in a clock data recovery (CDR) circuit. The CDR circuit extracts a clock for a transmitted signal by detecting edges of signal transition. However, in a case where a transition edge waveform is deformed due to chromatic dispersion, the clock extraction sensitivity decreases.

Note that the adaptive filter is a filter that operates in a case where transmission line conditions vary temporally to follow the variation to perform adaptive equalization. A transfer function for the adaptive filter varies temporally to cancel out a temporally varying transmission line transfer function. In the coherent optical transmission scheme, the polarization state of the signal generally varies temporally. Thus, the adaptive filter is often mounted in a digital signal processing apparatus for polarization tracking.

Note that the baud rate is also referred to as a symbol rate and represents how many symbols are transmitted per second. For example, in a case where symbols have two values, i.e., a high value and a low value, then the baud rate is equal to a bit rate.

Note that a modulation format is a modulation scheme for optical signals. Kinds of the modulation format include, for example, a quadrature phase shift keying (QPSK) scheme, an 8-phase shift keying (8-PSK) scheme, and a quadrature amplitude modulation (16 QAM) scheme.

In light of the foregoing, an object of the present invention is to provide a reception apparatus and a reception method that can estimate, without transmission or reception of a training signal sequence, the amount of chromatic dispersion even in a case where the baud rate and the modulation format of communication light are unknown.

Means for Solving the Problem

An aspect of the present invention is a reception apparatus including a dispersion compensation unit configured to acquire an electrical signal resulting from conversion of an optical signal and perform, on the electrical signal, dispersion compensation with a predetermined compensation amount, a clip rate measurement unit configured to measure a clip rate for the electrical signal subjected to the dispersion compensation, and a control unit configured to detect the compensation amount that minimizes the clip rate.

An aspect of the present invention is the reception apparatus described above, in which the control unit adjusts a magnitude of an amplitude of the electrical signal acquired by the dispersion compensation unit.

An aspect of the present invention is the reception apparatus described above, in which the control unit causes the clip rate measurement unit to measure the clip rate a plurality of times while varying the compensation amount of the dispersion compensation by the dispersion compensation unit, to detect the compensation amount that minimizes the clip rate.

An aspect of the present invention is the reception apparatus described above, in which the control unit evaluates the clip rate corresponding to each of the compensation amounts resulting from the variation, while varying the compensation amount at a predetermined step width between a preset minimum value and a preset maximum value, to detect the compensation amount that minimizes the clip rate.

An aspect of the invention is the reception apparatus as described above, in which the control unit evaluates a difference value between the clip rate corresponding to a first compensation amount and the clip rate corresponding to a second compensation amount obtained by increasing or reducing the first compensation amount by a predetermined amount, and repeats processing of increasing or reducing the compensation amount depending on a sign of the difference value until an absolute value of the difference value falls below a predetermined reference value, to detect the compensation amount that minimizes the clip rate.

An aspect of the present invention is the reception apparatus described above, in which the control unit coarsely adjusts the compensation amount such that an average amplitude of the electrical signal acquired by the dispersion compensation unit becomes a first amplitude, and finely adjusts the compensation amount such that the average amplitude becomes a second amplitude greater than the first amplitude.

An aspect of the present invention is a reception method performed by a computer of a reception apparatus, the reception method including acquiring an electrical signal resulting from conversion of an optical signal and performing, on the electrical signal, dispersion compensation with a predetermined compensation amount, measuring a clip rate for the electrical signal subjected to the dispersion compensation, and performing control by detecting the compensation amount that minimizes the clip rate.

Effects of the Invention

According to the present invention, the amount of chromatic dispersion can be estimated without transmission or reception of a training signal sequence, even in a case where the baud rate and the modulation format of communication light are unknown.

DESCRIPTION OF EMBODIMENTS

Figure 1:
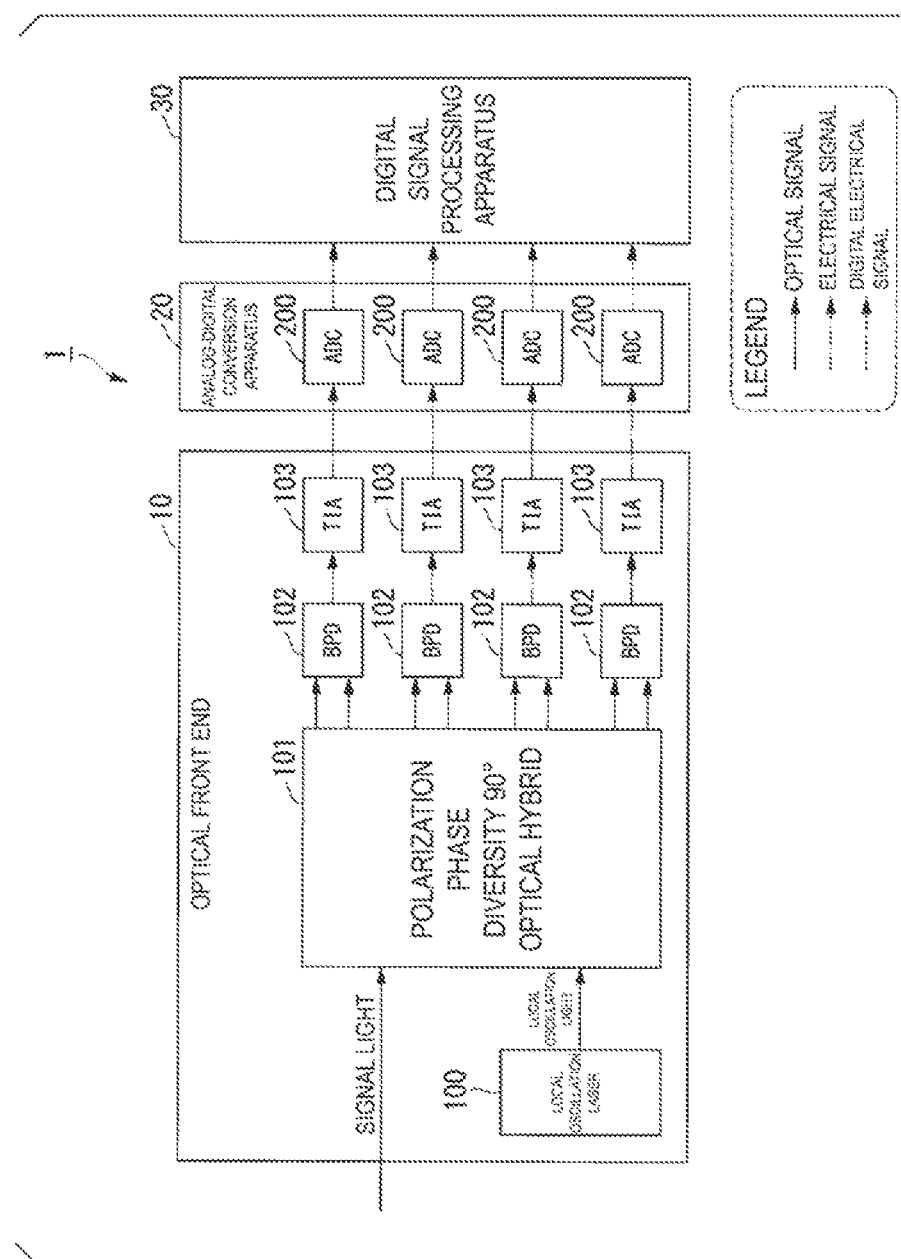
FIG. 1 is a block diagram illustrating a hardware configuration of an optical reception system 1 according to a first embodiment.

Modes for carrying out the present invention will be described with reference to the drawings. The embodiments described hereinafter are merely examples, and embodiments to which the present invention is applied are not limited to the following embodiments. Note that the same reference signs are used for those having the same functions in all the drawings used to describe the embodiments, and duplicate descriptions are omitted.

The present invention relates to a technique for estimating, in optical communication, the amount of chromatic dispersion occurring in a signal during transmission, without needing to learn in advance parameters for the signal such as a baud rate and a modulation format and without transmission or reception of a training signal sequence. In each embodiment of the present invention described below, a clip rate is used to estimate the amount of chromatic dispersion.

Specifically, a receiving side (optical reception system) includes a configuration for measuring the clip rate, in addition to a configuration for performing normal signal processing. The optical reception system measures the clip rate while sweeping the amount of chromatic dispersion compensation of compensating for the chromatic dispersion. Thus, the optical reception system detects the amount of chromatic dispersion compensation that minimizes the clip rate and sets the detected amount of chromatic dispersion compensation as an optimum value.

Note that the clip rate is a parameter varying in conjunction with the amount of chromatic dispersion. For example, the clip rate decreases as the amount of chromatic dispersion decreases. Thus, by estimating the amount of chromatic dispersion while monitoring the clip rate, the chromatic dispersion can be accurately compensated for without a need to learn the parameters, such as the baud rate and the modulation format, for the signal in advance.

First Embodiment

In a coherent optical transmission scheme according to a first embodiment described below, conditions for reducing the chromatic dispersion are searched for by utilizing a variation in the statistical distribution of a signal amplitude caused by the chromatic dispersion.

For example, in a QPSK signal, the absolute value of an instantaneous amplitude at a symbol position is always constant. However, when the QPSK signal is affected by the chromatic dispersion, temporally consecutive signal symbols interfere with each other, so that the instantaneous amplitude has a closer distribution to a Gaussian distribution. The reason is as follows: in a case where the signal is not affected by the chromatic dispersion, bits carried in the signal allow the signal amplitude to take various values, but in a case where the chromatic dispersion causes inter-symbol interference, leading to overlapping signals, the instantaneous amplitude has a closer distribution to a Gaussian distribution in compliance with the central limit theorem.

Note that the central limit theorem is a theorem indicating that, in a case where a population from which samples are extracted complies with a probability distribution with a mean $\mu$ and a standard deviation $\sigma$, the distribution of a sample average becomes closer to a normal distribution with the mean $\mu$ and a standard deviation $\sigma/\text{sqrt}(n)$ in keeping with an increase in the size of the extracted sample regardless of whatever probability distribution is complied with by the population.

Consequently, by taking statistics of the instantaneous amplitude at each point in time and evaluating how much the statistically obtained distribution approximates the Gaussian distribution, the amount of chromatic dispersion added to the signal can be estimated. Furthermore, by searching for the point at which the statistics of the signal amplitude are most different from the Gaussian distribution while varying the amount of chromatic dispersion compensation, the correct amount of chromatic dispersion compensation can be found. A problem here is how to evaluate the degree to which the statistics of the signal amplitude approximate the Gaussian distribution.

In the first embodiment, the above evaluation is performed by measuring the clip rate, as described above. Note that a sample clipped to a maximum or minimum value for quantization when the signal is digitized is referred to as a clip sample. The clip rate is the ratio of the clip samples to all samples. The signal amplitude with a larger amount of chromatic dispersion approximate more to the Gaussian distribution, and this increases the clip rate. The signal amplitude with a smaller amount of chromatic dispersion is more different from the Gaussian distribution, and this reduces the clip rate.

Note that the above-described phenomenon arises due to the feature that the Gaussian distribution is not a compact support (i.e., the Gaussian distribution returns a value that is not zero for values of plus and minus infinity). The compact support as used herein refers to the range of a value x in which the function F (x) returns a value other than zero being bounded (i.e., the range of the value x being within a constant range). The range of x in which the Gaussian function takes a value other than zero is $-\infty$ to $+\infty$, and thus the Gaussian function is not a compact support.

In contrast, the distribution of the signal amplitude not affected by the chromatic dispersion is approximately zero for the values of plus and minus infinity.

The optical reception system 1 according to the first embodiment described below includes a chromatic dispersion compensation unit and a clip rate measurement unit. The optical reception system 1 detects the amount of chromatic dispersion compensation that minimizes the clip rate while sweeping the amount of chromatic dispersion compensation. The minimum clip rate means that the chromatic dispersion of the signal has been optimally compensated for.

Hardware Configuration of Optical Reception System

Hereinafter, a hardware configuration of the optical reception system 1 will be described with reference to the drawings.

FIG. 1 is a block diagram illustrating a hardware configuration of the optical reception system 1 according to the first embodiment. As illustrated, the optical reception system 1 includes an optical front end 10, an analog-digital conversion apparatus 20, and a digital signal processing apparatus 30.

The optical front end 10 functions to convert an optical signal into an electrical signal while maintaining phase and amplitude information. As illustrated in FIG. 1, the optical front end 10 includes a local oscillation laser 100, a polarization phase diversity 90° optical hybrid 101, four balanced photo diodes (BPDs) 102, and four trans-impedance amplifiers (TIAs) 103.

The polarization phase diversity 90° optical hybrid 101 is a two-input eight-output optical circuit. Note that the polarization phase diversity 90° optical hybrid 101 is used in a homodyne detection scheme corresponding to a coherent reception scheme.

The polarization phase diversity 90° optical hybrid 101 causes received signal light and local oscillation light output from the local oscillation laser 100 to interfere with each other, extracts an in-phase component and an orthogonal component of electric field of the received light, and outputs the components to the BPDs 102.

The BPDs 102 are differential input type photoelectric converters. Each BPD 102 outputs, to a corresponding one of the TIAs 103, a difference value between photocurrents generated in two respective photodiodes with the same properties.

Each TIA 103 corresponds to a form of amplifier circuit for current input and voltage output. The TIAs 103 are widely used in optical receivers. The TIAs 103 output electrical signals to the analog-to-digital conversion apparatus 20 as four-lane time-series electrical signals. The respective four-lane time-series electrical signals correspond to a horizontal polarization in-phase component, a horizontal polarization orthogonal component, a vertical polarization in-phase component, and a vertical polarization orthogonal component.

The analog-to-digital conversion apparatus 20 functions to convert the time-series electrical signals into temporally discrete, quantized digital signals. As illustrated in FIG. 1, the analog-to-digital conversion apparatus 20 includes four analog to digital converters (ADCs) 200 corresponding to the respective four-lane electrical signals. The analog to digital conversion apparatus 20 converts the four-lane time-series electrical signals into four-lane digital signal sequences.

The digital signal processing apparatus 30 is implemented as an application specific integrated circuit (ASIC) or a field-programmable gate array (FPGA).

Note that the ASIC is an integrated circuit for specific applications. Generally, a signal processing apparatus for a coherent receiver is often implemented as an ASIC. Additionally, the FPGA is an integrated circuit for which the configuration can be designed by a purchaser or a designer after manufacturing.

Note that the analog-to-digital conversion apparatus 20 and the digital signal processing apparatus 30 may be integrated into the same ASIC or FPGA chip.

The chromatic dispersion compensation unit and the clip rate measurement unit, which are important components according to the present invention, are included in the digital signal processing apparatus 30. Hereinafter, the configuration of the digital signal processing apparatus 30 will be described in detail.

Logical Configuration of Digital Signal Processing Apparatus

Figure 2:
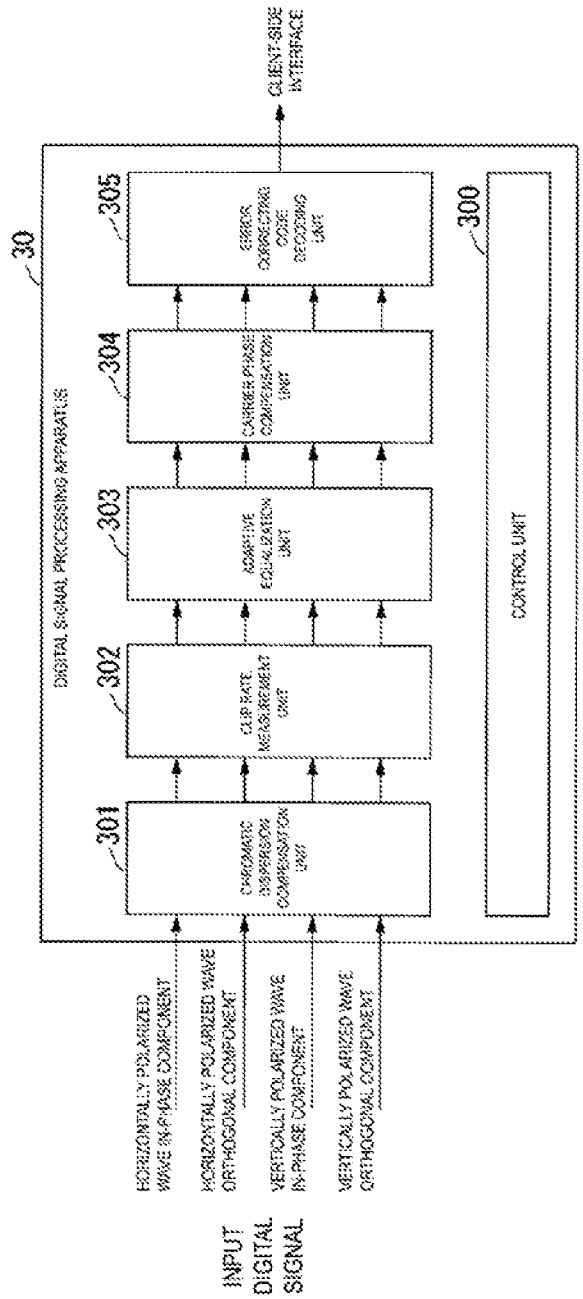
FIG. 2 is a block diagram illustrating a logical configuration of a digital signal processing apparatus 30 according to the first embodiment.

FIG. 2 is a block diagram illustrating a logical configuration of the digital signal processing apparatus 30 according to the first embodiment. As illustrated, the digital signal processing apparatus 30 (reception apparatus) includes a control unit 300, a chromatic dispersion compensation unit 301, a clip rate measurement unit 302, an adaptive equalization unit 303, a carrier phase compensation unit 304, and an error correcting code decoding unit 305.

The four-lane digital signal sequences output from the analog-to-digital conversion apparatus 20 are input to the chromatic dispersion compensation unit 301. In the chromatic dispersion compensation unit 301, chromatic dispersion based on a given set value (amount of chromatic dispersion compensation) is provided to the input digital signals. In a case where the chromatic dispersion based on the set value and the chromatic dispersion to which the optical signal is subjected in the transmission line cancel each other, the chromatic dispersion to which the optical signal is subjected in the transmission line is compensated for.

The four-lane digital signals output from the chromatic dispersion compensation unit 301 are input to the clip rate measurement unit 302. In the clip rate measurement unit 302, for the input digital signal sequences, the number of samples having the maximum value or the minimum value (clip samples) is counted, and the rate of the counted clip samples to all the samples (clip rate) is calculated.

Note that the clip rate measurement unit 302 may be configured to count the number of samples for which the absolute value of the value for each of the digital signal sequences is greater than a previously optionally set threshold, and the rate of the counted samples to all the samples is calculated.

The four-lane digital signals output from the clip rate measurement unit 302 are input to the adaptive equalization unit 303. The adaptive equalization unit 303 performs polarization following processing and polarization mode dispersion compensation processing.

The four-lane digital signals output from the adaptive equalization unit 303 are input to the carrier phase compensation unit 304. The carrier phase compensation unit 304 performs processing such as compensation for frequency offset and phase noise.

The four-lane digital signals output from the carrier phase compensation unit 304 are input to the error correcting code decoding unit 305. The error correcting code decoding unit 305 performs error correction processing. The decoded digital data is output to a client-side interface.

The control unit 300 controls the operation of each functional block of the digital signal processing apparatus 30. The control unit 300 is implemented as a program that operates in an embedded system. Note that the embedded system may be integrated on an ASIC or FPGA, or may be operated by a device in a specific chip.

Operation of Digital Signal Processing Apparatus

Figure 3:
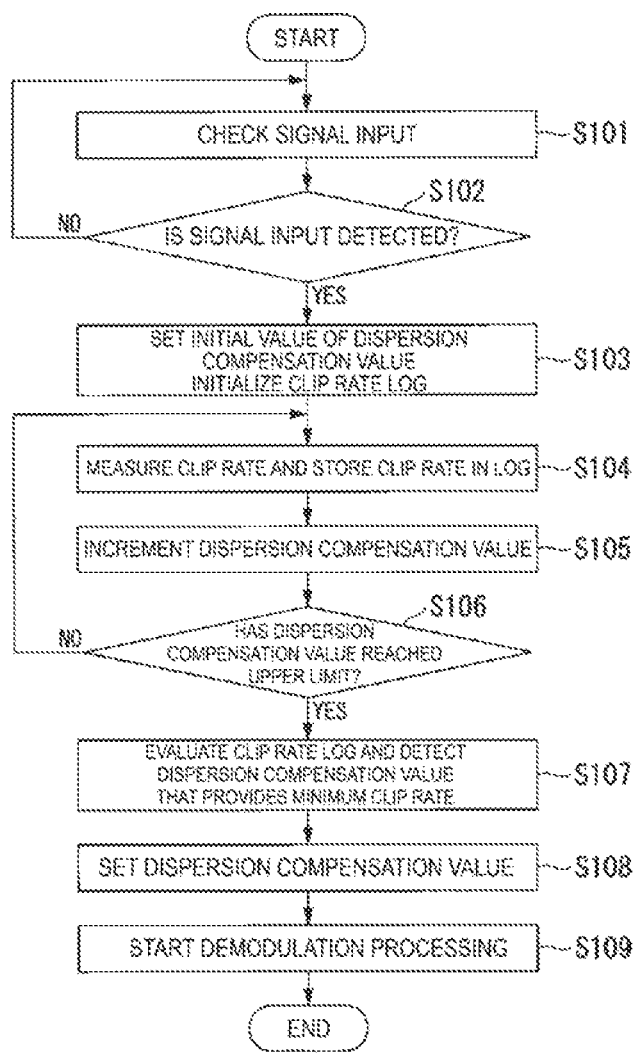
FIG. 3 is a flowchart illustrating operation of the digital signal processing apparatus 30 according to the first embodiment.

An example of operation of the digital signal processing apparatus 30 will be described below. FIG. 3 is a flowchart illustrating operation of the digital signal processing apparatus 30 according to the first embodiment. The processing in the present flowchart starts when the digital signal processing apparatus 30 is powered on.

The control unit 300 checks whether there is a signal input of a digital signal to the chromatic dispersion compensation unit 301 (step S101). In a case of not detecting a signal input of a digital signal to the chromatic dispersion compensation unit 301 (step S102, No), the control unit 300 continues to check whether there is a signal input (step S101).

In a case of detecting a signal input of a digital signal to the chromatic dispersion compensation unit 301 (step S102, Yes), the control unit 300 sets, for the chromatic dispersion compensation unit 301, an initial value of the amount of chromatic dispersion compensation. Additionally, the control unit 300 initializes a clip rate log stored in a storage unit (not illustrated) (step S103).

The clip rate measurement unit 302 measures the clip rate. The control unit 300 causes the storage unit (not illustrated) to store a measurement result of the clip rate as a clip rate log (step S104). The clip rate log is data in which the amount of chromatic dispersion compensation is associated with the clip rate.

The control unit 300 increments the amount of chromatic dispersion compensation set for the chromatic dispersion compensation unit 301 (step S105). Note that the value for increment (step width) is preset.

The control unit 300 determines whether the amount of chromatic dispersion compensation set for the chromatic dispersion compensation unit 301 has reached an upper limit value or not. In a case where the amount of chromatic dispersion compensation has not reached the upper limit value (step S106, No), the control unit 300 causes the above-described clip rate measurement processing by the clip rate measurement unit 302 and the processing for storing the clip rate log (step S104 and step S105) to continue until the amount of chromatic dispersion compensation reaches the upper limit value.

In a case where the amount of chromatic dispersion compensation reaches the upper limit value (step S106, Yes), the control unit 300 evaluates the clip rate log and detects the amount of chromatic dispersion compensation that minimizes the clip rate (step S107).

The control unit 300 sets, for the chromatic dispersion compensation unit 301, the detected amount of chromatic dispersion compensation that minimizes the clip rate (step S108). Subsequently, the control unit 300 starts demodulation processing (step S109).

Thus, the processing in the present flowchart ends.

Second Embodiment

A second embodiment will be described below.

Operation of Digital Signal Processing Apparatus

Figure 4:
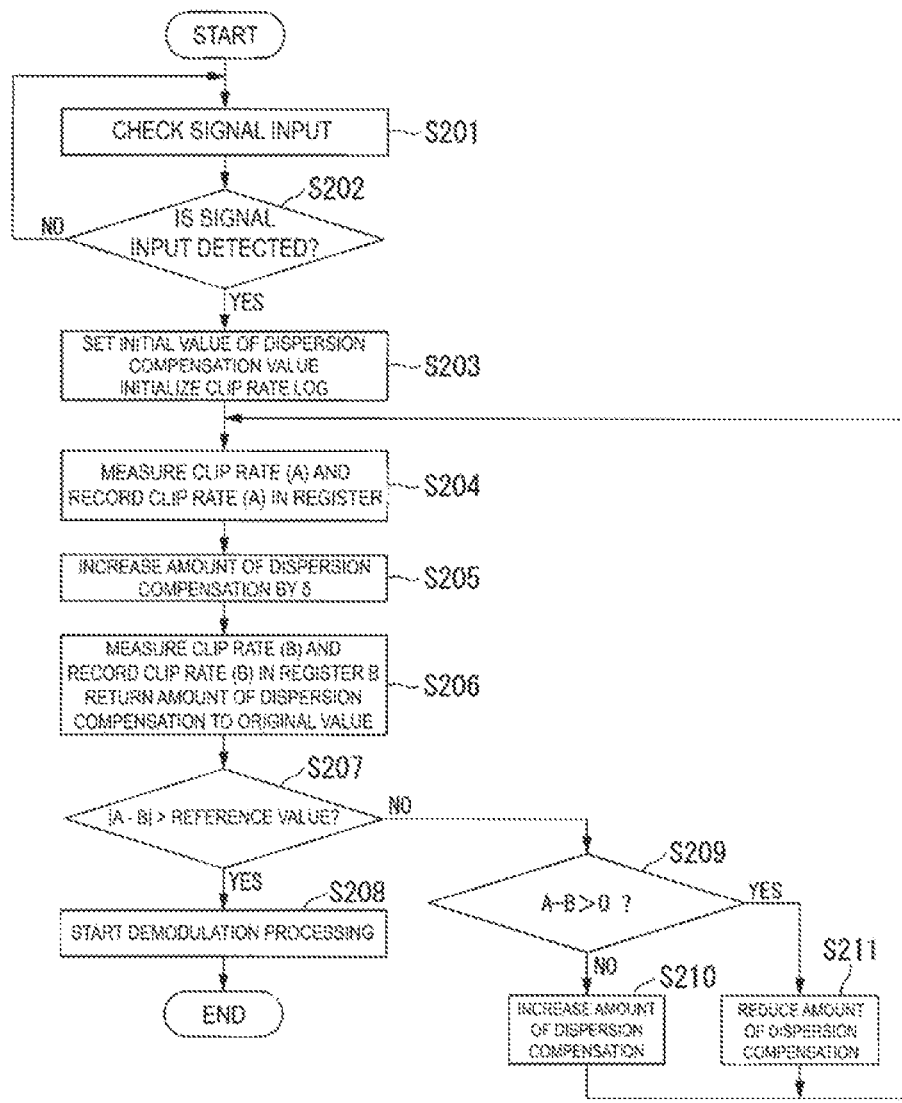
FIG. 4 is a flowchart illustrating operation of the digital signal processing apparatus 30 according to a second embodiment.

An example of operation of the digital signal processing apparatus 30 will be described below. FIG. 4 is a flowchart illustrating operation of the digital signal processing apparatus 30 according to the second embodiment. The processing in the present flowchart starts when the digital signal processing apparatus 30 is powered on.

Note that the processing from step S201 to step S203 in the flowchart illustrated in FIG. 4 is the same as the processing from step S101 to step S103 in the flowchart illustrated in FIG. 3, and thus description of the processing is omitted.

After the control unit 300 sets, for the chromatic dispersion compensation unit 301, the initial value of the amount of chromatic dispersion compensation, the clip rate measurement unit 302 measures the clip rate. The control unit 300 causes the measured clip rate (clip rate corresponding to the first compensation amount) to be stored in a register a (not illustrated) (step S204).

The control unit 300 increases the amount of chromatic dispersion compensation set for the chromatic dispersion compensation unit 301 by δ (predetermined amount) (step S205). The clip rate measurement unit 302 measures the clip rate again. The control unit 300 causes a register b (not illustrated) to store the measured clip rate (clip rate corresponding to the second compensation amount). Subsequently, the clip rate measurement unit 302 returns, to the original value, the amount of chromatic dispersion compensation set for the chromatic dispersion compensation unit 301 (step S206).

The control unit 300 evaluates a difference value (A−B) between the clip rate (A) stored in the register a and the clip rate (B) stored in the register b, and compares the absolute value of the difference value (|A−B|) with a reference value.

In a case where the absolute value of the difference value (|A−B|) is greater than the reference value (step S207, No) and where the difference value (A−B) is a positive value (step S209, yes), the control unit 300 decreases the amount of chromatic dispersion compensation set for the chromatic dispersion compensation unit 301 (step S211). In a case where the difference value (A−B) is a negative value (step S209, No), the control unit 300 increases the amount of chromatic dispersion compensation set for the chromatic dispersion compensation unit 301 (step S210). Then, the control unit 300 causes the clip rate measurement processing by the clip rate measurement unit 302 and the processing for storing the clip rate to continue (steps S204 to S206).

In a case where the absolute value of the difference value (|A−B|) is smaller than the reference value (step S207, Yes), the control unit 300 starts the demodulation processing (step S208). Thus, the processing in the present flowchart ends. In the above-described processing, the processing for adjusting the amount of chromatic dispersion compensation is repeated until the absolute value of the difference value (|A−B|) falls below the predetermined reference value.

Note that the processing in the first embodiment illustrated in FIG. 3 may be combined with the processing in the second embodiment illustrated in FIG. 4. For example, after the amount of chromatic dispersion compensation is coarsely adjusted by the processing in the first embodiment illustrated in FIG. 3, the amount of chromatic dispersion compensation obtained by the coarse adjustment may be used as an initial value to finely adjust the amount of chromatic dispersion compensation by the processing in the second embodiment illustrated in FIG. 4.

Additionally, the processing according to the second embodiment illustrated in FIG. 4 may be used for tracking a drift of the amount of chromatic dispersion in the transmission line. In this case, δ set to a sufficiently small value allows the receiver in operation to perform the processing in the second embodiment illustrated in FIG. 4.

Third Embodiment

A third embodiment will be described below.

In each of the embodiments described above, the sensitivity of the chromatic dispersion estimation based on the clip rate depends on the average amplitude of the input signal to the chromatic dispersion compensation unit 301. Processing according to the third embodiment uses the properties of the sensitivity of the chromatic dispersion estimation based on the clip rate to reduce the magnitude of the input signal and perform coarse adjustment and then to increase the magnitude of the input signal and perform fine adjustment.

Figure 5:
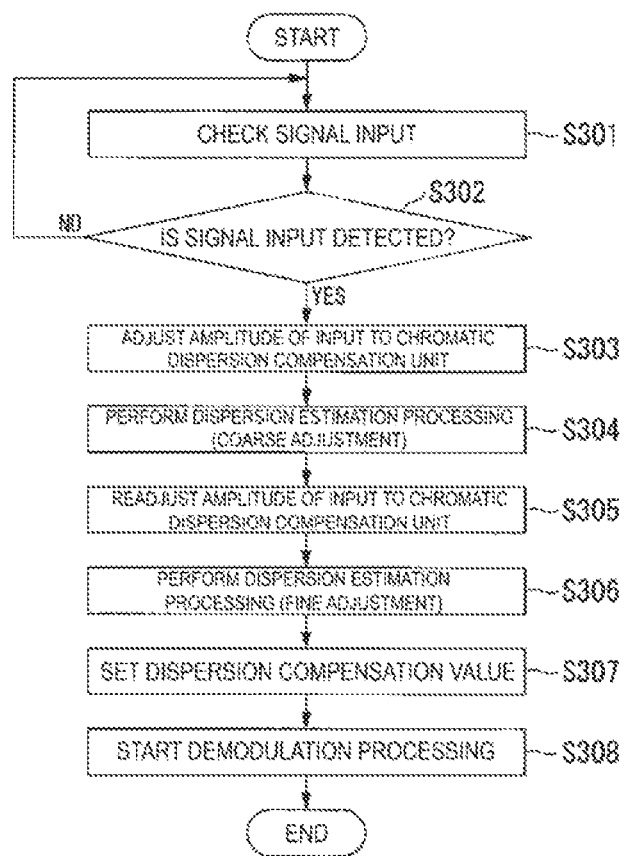
FIG. 5 is a flowchart illustrating operation of the digital signal processing apparatus 30 according to a third embodiment.

FIG. 5 is a flowchart illustrating operation of the digital signal processing apparatus 30 according to the third embodiment. The processing in the present flowchart starts when the digital signal processing apparatus 30 is powered on.

Note that the processing from step S301 to step S302 in the flowchart illustrated in FIG. 5 is the same as the processing from step S101 to step S102 of the flowchart illustrated in FIG. 3, and thus description of the processing is omitted.

The control unit 300 adjusts the magnitude of the amplitude (first amplitude) of a signal input to the chromatic dispersion compensation unit 301 (step S303).

The control unit 300 performs dispersion estimation processing to perform coarse adjustment (step S304).

The control unit 300 readjusts the magnitude of the amplitude (second amplitude) of the signal input to the chromatic dispersion compensation unit 301 (step S305).

The control unit 300 performs dispersion estimation processing to perform fine adjustment (step S306).

The control unit 300 sets the determined amount of chromatic dispersion compensation for the chromatic dispersion compensation unit 301 (step S307).

The control unit 300 starts the demodulation processing (step S308).

Thus, the processing in the present flowchart ends.

Note that, for example, the processing according to the first embodiment illustrated in FIG. 3 can be used as the processing in step S304, and the processing according to the second embodiment illustrated in FIG. 4 can be used as the processing in step S306.

According to the digital signal processing apparatus 30 according to the above-described embodiment, the amount of chromatic dispersion can be estimated without transmission or reception of a training signal sequence, even in a case where the baud rate and the modulation format of communication light are unknown. The present technique allows chromatic dispersion compensation to be performed even in a case where the baud rate and modulation format are unknown, and is thus also useful, for example, in a case where an optical data transmission system is constructed that allows the baud rate and the modulation format to be varied depending on the situation.

While it is difficult to determine the baud rate and modulation format of an optical signal not subjected to compensation for chromatic dispersion, use of the reception method according to the embodiments described above enables the baud rate and modulation format to be determined by estimating the amount of chromatic dispersion of the optical signal and compensating for the chromatic dispersion by using the digital signal processing.

Note that a part or all of the optical reception system 1 according to the embodiments described above may be implemented by a computer. In that case, the optical reception system 1 may be implemented by recording, in a computer-readable recording medium, a program for implementing the functions of the optical reception system 1, and causing a computer system to read and execute the program recorded in the recording medium. Note that the "computer system" as used herein includes an OS and hardware such as a peripheral device. The "computer-readable recording medium" refers to a portable medium such as a flexible disk, a magneto-optical disk, a ROM, and a CD-ROM, and a storage apparatus such as a hard disk installed in a computer system. Further, the "computer-readable recording medium" may also include such a medium that stores programs dynamically for a short period of time, one example of which is a communication line used when a program is transmitted via a network such as the Internet and a communication line such as a telephone line, and may also include such a medium that stores programs for a certain period of time, one example of which is volatile memory inside a computer system that functions as a server or a client in the above-described case. Further, the above program may be a program for implementing a part of the above-mentioned functions. The above program may be a program capable of implementing the above-mentioned functions in combination with another program already recorded in a computer system. The above program may be a program to be implemented with the use of a programmable logic device such as a field programmable gate array (FPGA).

The embodiments of the present invention have been described above in detail with reference to the drawings. However, specific configurations are not limited to those embodiments, and include any design or the like within the scope not departing from the gist of the present invention.

REFERENCE SIGNS LIST

1 Optical reception system
10 Optical front end
20 Analog-digital conversion apparatus
30 Digital signal processing apparatus
100 Local oscillation laser
101 Polarization phase diversity 90° optical hybrid
102 BPD
103 TIA
200 ADC
300 Control unit
301 Chromatic dispersion compensation unit
302 Clip rate measurement unit
303 Adaptive equalization unit
304 Carrier phase compensation unit
305 Error correcting code decoding unit

The invention claimed is:

1. A reception apparatus comprising:
a dispersion compensation unit configured to acquire an electrical signal resulting from conversion of an optical signal and perform, on the electrical signal, dispersion compensation with a predetermined compensation amount;
a clip rate measurement unit configured to measure a clip rate for the electrical signal subjected to the dispersion compensation; and
a control unit configured to detect the compensation amount that minimizes the clip rate, wherein the control unit causes the clip rate measurement unit to measure the clip rate a plurality of times while varying the compensation amount of the dispersion compensation by the dispersion compensation unit, to detect the compensation amount that minimizes the clip rate.

2. The reception apparatus according to claim 1, wherein the control unit adjusts a magnitude of an amplitude of the electrical signal acquired by the dispersion compensation unit.

3. The reception apparatus according to claim 1, wherein the control unit evaluates the clip rate corresponding to each of the compensation amounts resulting from the variation while varying the compensation amount at a predetermined step width between a preset minimum value and a preset maximum value, to detect the compensation amount that minimizes the clip rate.

4. The reception apparatus according to claim 1, wherein the control unit evaluates a difference value between the clip rate corresponding to a first compensation amount and the clip rate corresponding to a second compensation amount obtained by increasing or reducing the first compensation amount by a predetermined amount, and repeats processing of increasing or reducing the compensation amount depending on a sign of the difference value until an absolute value of the difference value falls below a predetermined reference value, to detect the compensation amount that minimizes the clip rate.

5. The reception apparatus according to claim 1, wherein the control unit coarsely adjusts the compensation amount such that an average amplitude of the electrical signal acquired by the dispersion compensation unit becomes a first amplitude, and finely adjusts the compensation amount such that the average amplitude becomes a second amplitude greater than the first amplitude.

* * * * *